(12) United States Patent
Nagao

(10) Patent No.: US 6,344,847 B1
(45) Date of Patent: *Feb. 5, 2002

(54) COORDINATE DETECTION DEVICE

(75) Inventor: Naoyuki Nagao, Tokyo (JP)

(73) Assignee: Fujitsu Takamisawa Component Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,338

(22) Filed: Jul. 22, 1998

(30) Foreign Application Priority Data

Oct. 3, 1997 (JP) ............................... 9-271732

(51) Int. Cl.⁷ ................................................ G09G 5/00
(52) U.S. Cl. ..................................................... 345/173
(58) Field of Search ................................. 345/173–179, 345/146, 163

(56) References Cited

U.S. PATENT DOCUMENTS

| 5,633,659 | A | * | 5/1997 | Furuhashi et al. | 345/173 |
| 5,666,113 | A | * | 9/1997 | Logan | 341/34 |
| 5,943,043 | A | * | 8/1999 | Furuhata et al. | 345/173 |
| 6,037,929 | A | * | 3/2000 | Ogura et al. | 345/168 |
| 6,061,051 | A | * | 5/2000 | Chan et al. | 345/173 |

* cited by examiner

Primary Examiner—Almis R. Jankus
(74) Attorney, Agent, or Firm—Staas & Halsey LLP

(57) ABSTRACT

A coordinate detection device includes a coordinate input panel which generates coordinate data based on voltages obtained when the coordinate input panel is touched, a first unit which determines whether a touch operation on the coordinate input panel satisfies a predetermined condition, and a second unit which outputs switch information based on a result of a determination executed by the first unit.

3 Claims, 7 Drawing Sheets

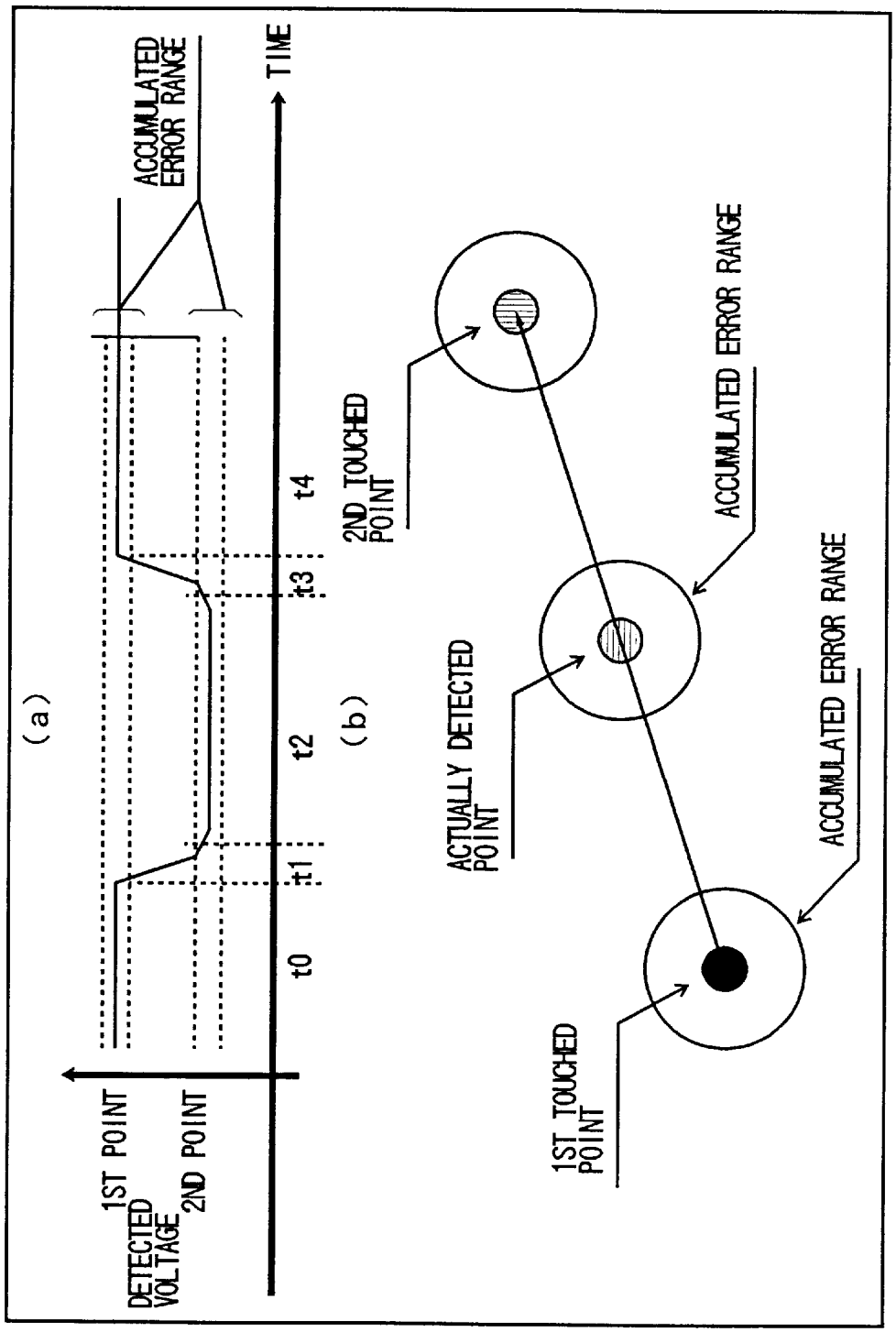

COORDINATE DETECTION DEVICE

BACKGROUND OF THE INVENTION

1. Field of the Invention

The present invention generally relates to a coordinate detection device which generates switch information on the basis of the values of voltages which are generated when an operator touches a coordinate input panel having the X and Y coordinates.

Recently, man-machine interface systems have been improved so that everybody can easily operate information processing devices such as personal computers and word processors. The keyboard which was mainly used as a means for inputting information has been replaced by a mouse or the like. Particularly, portable devices, which are frequently used in a situation in which a table or the like is not available, employ, instead of the mouse, an information input means which does not need the operation area. Examples of such an information input means are a pointing device and a coordinate detection device.

2. Description of the Related Art

A coordinate detection device which uses a coordinate input panel is easily applied to a graphical user interface and has a high operationability and a long lifetime. Thus, such a coordinate detection device is mainly applied to portable devices as an information input means. Conventionally, a coordinate detection device of a magnetic induction type or an electrostatic coupling type is mainly used. Nowadays, a coordinate detection device of a voltage detection type using a resistance film type is attracted because it allows input coordinate information to be input by a cordless pen or finger and has a less-expensive, simple structure.

When an input is given to the coordinate input panel by the cordless pen or finger, the conventional coordinate detection device of the voltage detection type generates coordinate data for moving a cursor on the basis of voltage values obtained by a touch to the panel. Further, the coordinate detection device can recognize the input by the cordless pen or finger as a single switch input. In this case, the input by the cordless pen or finger is transmitted to an information processing device as switch information, and functions as a command input to the information processing device.

The coordinate detection device is required to realize two switches which are generally provided to the mouse so that the coordinate detection device can completely be substituted for the mouse. The conventional coordinate detection device can realize only a single switch because a touch to the coordinate input panel by the cordless pen or finger corresponds to the ON/OFF operation of a single switch.

SUMMARY OF THE INVENTION

It is a general object of the present invention to provide a coordinate detection device in which the above disadvantage is eliminated.

A more specific object of the present invention is to provide a coordinate detection device capable of generating information concerning a plurality of switches and outputting the switch information thus generated to an external device.

The above objects of the present invention are achieved by a coordinate detection device comprising: a coordinate input panel which generates coordinate data based on voltages obtained when the coordinate input panel is touched; a first unit which determines whether a touch operation on the coordinate input panel satisfies a predetermined condition; and a second unit which outputs switch information based on result of a determination executed by the first unit.

The above coordinate detection device may be configured so that the predetermined condition defines a combination of a touched state and an untouched state.

The coordinate detection device may be configured so that: the predetermined condition defines continuing times of an untouched state, a touched state and an untouched state which states occur in this order; and the first unit determines whether the touch operation has continuing times equal to or longer than the continuing times of the predetermined condition.

The coordinate detection device may be configured so that: the predetermined condition defines continuing times of an untouched state, a touched state, an untouched state, a touched state and an untouched state which states occur in this order; and the first unit determines whether the touch operation has continuing times equal to or longer than the continuing times of the predetermined condition.

The coordinate detection device may be configured so that the predetermined condition relates to a touch operation on an arbitrary point on the coordinate input panel.

The coordinate detection device may be configured so that the predetermined condition relates to a touch operation on an arbitrary point on the coordinate input panel.

The coordinate detection device may be configured so that the predetermined condition defines a touch operation in which a first point on the coordinate input panel is touched and a second point thereon is touched while the first point is touched.

The coordinate detection device may be configured so that the second unit outputs the switch information based on coordinates of the second point on the coordinate input panel.

The coordinate detection device may be configured so that: a plurality of areas for respective switches are defined on the coordinate input panel; and the first unit determines, for each of the plurality of areas, whether the touch operation on the coordinate input panel satisfies the predetermined condition.

BRIEF DESCRIPTION OF THE DRAWINGS

Other objects, features and advantages of the present invention will become more apparent from the following detailed description when read in conjunction with the accompanying drawings, in which:

FIG. 5 is a diagram showing yet another condition for generating switch information;

DESCRIPTION OF THE PREFERRED EMBODIMENTS

Figure 1:
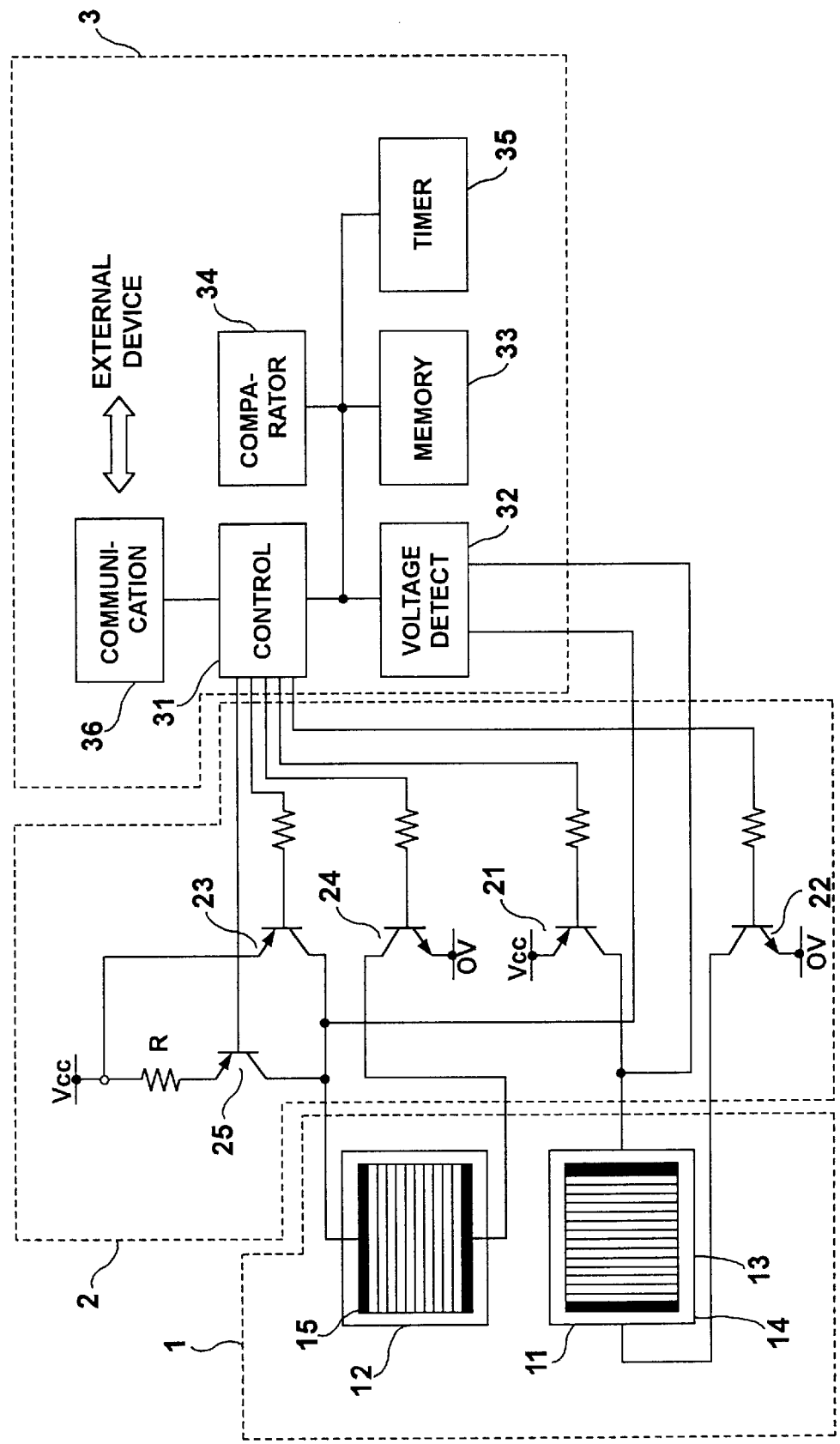
FIG. 1 is a block diagram of a coordinate detection device according to an embodiment of the present invention.

FIG. 1 shows a coordinate detection device according to an embodiment of the present invention.

The coordinate detection device shown in FIG. 1 includes a coordinate input panel 1, a drive circuit 2, and a control circuit 3. The coordinate input panel 1 has a contact plane to which an operator who operates an external device such as an information processing device touches by a cordless pen or finger. The drive circuit applies voltages to the coordinate input panel 1. The control circuit 3 controls the driver circuit 2. In response to a touch operation on the panel 1, the coordinate detection device can generate and output switch information, the degree of a movement of the cordless pen or finger on the panel 1 and coordinate data indicating the coordinates of a position on the panel 1.

The coordinate input panel 1 includes two electrically conductive films or sheets 11 and 12, which face each other via a space. Each of the conductive films 12 has an input range 13 and a pair of electrodes provided in edges of the film. More particularly, a pair of electrodes 14 are provided on the conductive film 11 so that the input range 13 is interposed therebetween. Similarly, a pair of electrodes 15 are provided on the conductive film 12 so that the input range 13 is interposed therebetween. The pair of electrodes 14 is oriented so as to be orthogonal to the pair of electrodes 15. The pair of electrodes 14 on the conductive film 11 extends in parallel with the Y axis, and the pair of electrodes 15 on the conductive film 12 extends in parallel with the X axis. The pair of electrodes 14 is used to detect the X coordinate, and the pair of electrodes 15 is used to detect the Y coordinate.

The drive circuit 2 includes transistors 21, 22, 23 and 24. The transistors 21 and 22 function to apply a voltage (Vcc) across the pair of electrodes 14 provided on the conductive film 11. The transistors 23 and 24 function to apply the voltage across the pair of electrodes 15 on the conductive film 12. The pairs of transistors 21 and 22 and 23 and 24 are alternately turned ON, so that the voltage is alternately applied to the conductive films 11 and 12.

Further, the driver circuit 2 includes a touch sense circuit having a resistor R and a transistor 25.

The control circuit 3 includes a control part 31, a voltage detection part 32, a memory part 33, a comparator part 34, a timer part 35 and a communication part 36. The control part 3 detects the values of the voltages of the coordinate input panel 1, and sends coordinate data and switch information concerning the detected voltage values to an external device such as an information processing device.

The control part 31 of the control circuit 3 controls the transistors 21, 22, 23 and 24 to alternately apply the drive voltage to the conductive films 11 and 12. When a switch input is supplied from the coordinate input panel 1, the control part 31 generates the switch information.

The voltage detection part 32 detects a voltage in order to determine whether the coordinate input panel 1 is pushed or touched, and detects the values of the voltages corresponding to the X and Y coordinates of the touched point on the coordinate input panel 1.

The memory part 33 stores the voltage values detected by the voltage detection part 32, and switch data which serves as a condition for making a decision as to whether the switch input takes place.

The comparator part 34 compares the value of the voltage detected when the coordinate input panel 1 is touched with a threshold voltage for discriminating the touched state from the untouched state, and thus determines whether the coordinate input panel 1 is touched. Further, the comparator part 34 compares the switch data stored in the memory part 33 with the detected voltage value, and determines whether the switch input takes place.

The timer 35 measures a touched/untouched time for making a decision as to whether the input from the coordinate input panel 1 is a switch input.

The communication part 36 sends the switch information and other information to the external device.

When a point on the coordinate input panel 1 is touched or depressed, the conductive films 11 and 12 are touched at the depressed point (input point). When the voltage is applied across the pair of electrodes 14, the voltage is divided at the input point, and a divided voltage VI indicative of the X coordinate is output via the pair of electrodes 15. When the voltage is applied across the pair of electrodes 15, the voltage is divided at the input point, and a divided voltage V2 indicative of the Y coordinate is output to the pair of electrodes 14. The voltage detection part 32 converts the voltages VI and V2 into a digital signal (coordinate values), which is then input to the control part 31.

In order to determine whether the panel 1 is touched or untouched, the control part 31 turns ON the transistor 25, and a voltage is applied across the conductive films 11 and 12. A voltage input to the voltage detection part 32 from the pair of electrodes 15 is, for example, a voltage obtained by dividing the drive voltage Vcc by the resistor R and the contact resistor of the conductive films 11 and 12.

Figure 2:
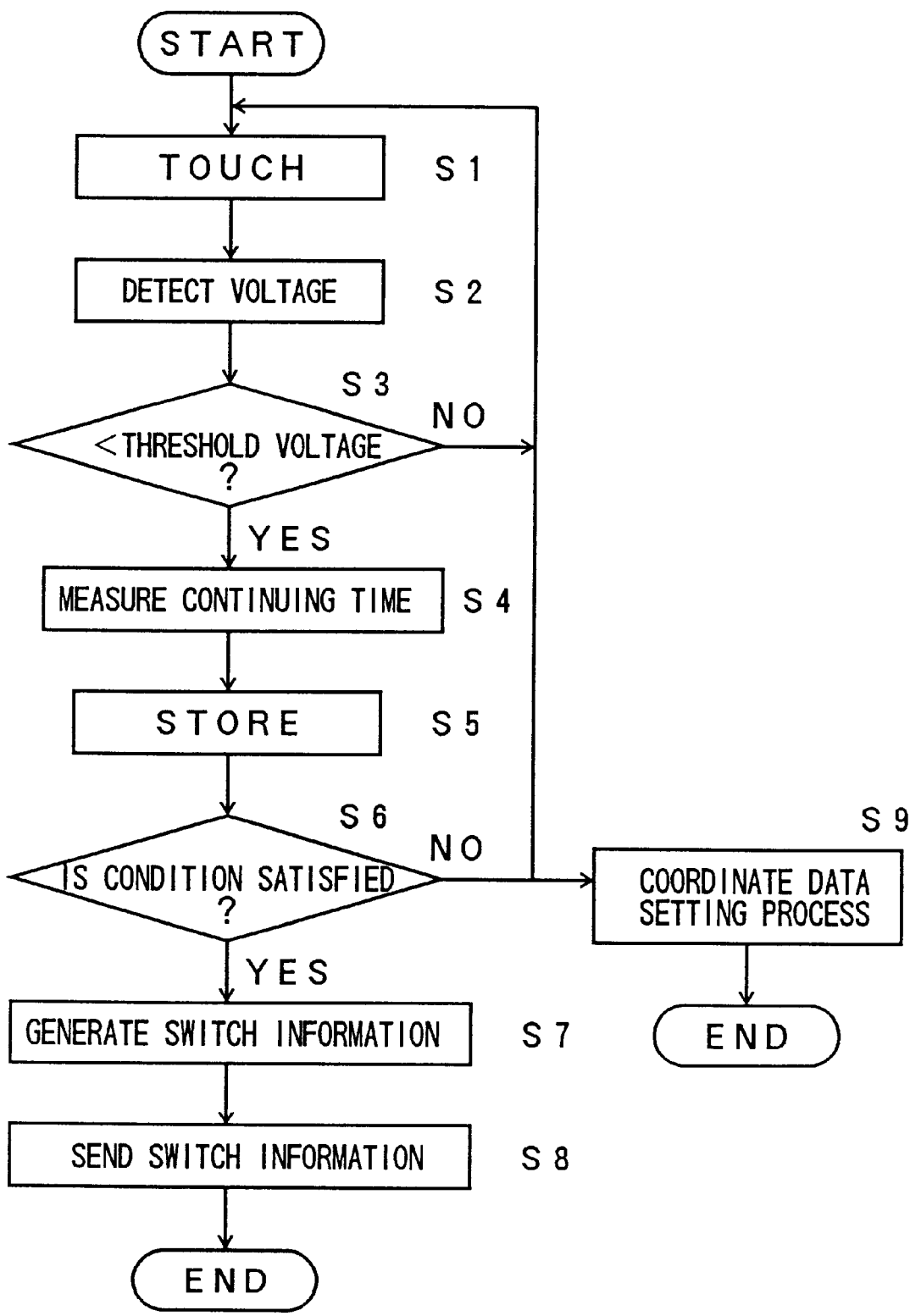
FIG. 2 is a flowchart of an operation of the coordinate detection device shown in FIG. 1.

A description will now be given, with reference to FIG. 2, of an operation of the coordinate detection device in which the value of the voltage obtained in the depressed position on the panel 1 is detected and switch information is output.

The touch plane of the coordinate input panel 1 is depressed (step S1 in FIG. 2), the voltage detection part 32 detects that the conductive films 11 and 12 are touched. Thus, the control part 31 turns ON the transistor 25. The voltage value obtained at that time is detected as follows (S2). The voltage is applied across the conductive films 11 and 12. The divided voltage input to the voltage detection part 31 from the pair of electrodes 15 is input to the voltage detection part 32. The divided voltage is generated by dividing the drive voltage Vcc by the resistor R and the contact resistor of the conductive films 11 and 12.

The comparator part 34 compares the voltage value detected by the voltage detection part 32 with the threshold voltage for determining whether the conductive films 11 and 12 are touched (S3). If the voltage value detected by the voltage detection part 32 is greater than the threshold voltage (NO at step S3), the coordinate detection device is in the standby state until the voltage detection part 32 detects a contact between the conductive films 11 and 12. If the voltage value detected by the voltage detection part 32 is smaller than the threshold voltage (YES at step S3), the voltage detection part 32 detects the voltage values of the X and Y coordinates, and measures the continuing time during which the above voltage value is maintained (S4). Then, the voltage detection part 32 stores the voltage value and the continuing time in the memory part 33 so as to correspond to each other (S5).

The comparator part 34 compares the voltage value and the continuing time stored in the memory part 33 with the switch data registered by the operator who operates the external device, and determines whether the input from the coordinate input panel 1 is a switch input (S6).

Now, a description will be given, with reference to FIGS. 3, 4 and 5 of the condition which is registered as the switch data and is used to determine the input from the coordinate input panel 1 is a switch input.

Figure 3:
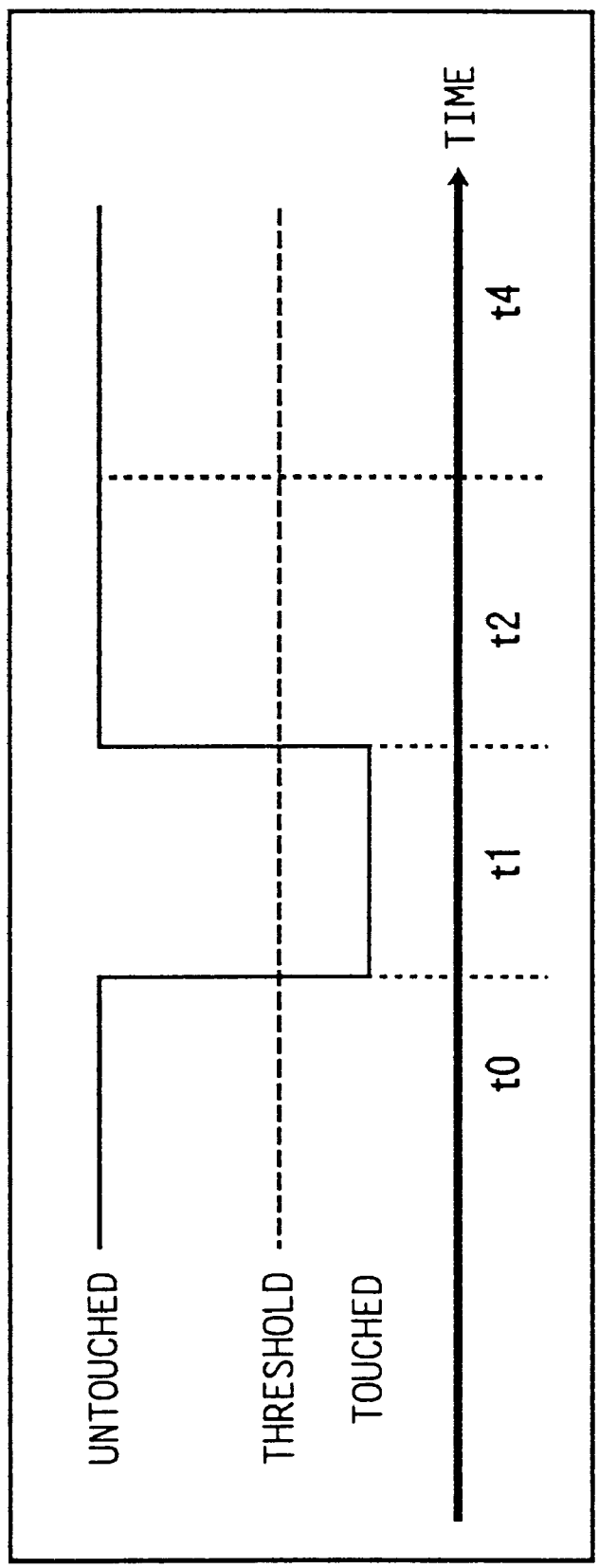
FIG. 3 is a diagram showing a condition for generating switch information.

FIG. 3 shows a condition necessary for the comparator part 34 to determine whether the input generated when the operator touches a point on the coordinate input panel 1 is a switch input. In FIG. 3, symbols t0, t1, t2 and t3 are respectively switch data which are registered beforehand and denote respective continuing times during which the panel is in the touched/untouched state. The voltage value detected when the panel 1 is touched is lower than the threshold voltage, while the voltage value detected when the panel 1 is in the untouched state is higher than the threshold voltage. According to the condition shown in FIG. 3, the comparator part 34 recognizes the input from the panel 1 is a switch input when the continuing times in the untouched and touched states are equal to or longer than t0 and t1, respectively, and then the continuing time in the untouched state is equal to or longer than t2.

If the input from the panel 1 satisfies the above condition (YES at step S6), the coordinate detection device executes a process for supplying the external device with switch information which corresponds to a signal generated when the left button of the mouse is clicked once. In contrast, if it is determined that the condition is not satisfied (NO at step S6), the coordinate detection device executes a process for supplying the external device with coordinate data with which the cursor can be moved in the conventional manner (S9). The above description is directed to the case where the left button of the mouse is clicked. However, the switch information generated in the above-mentioned manner can be used to define various switches other than the left button.

Figure 4:
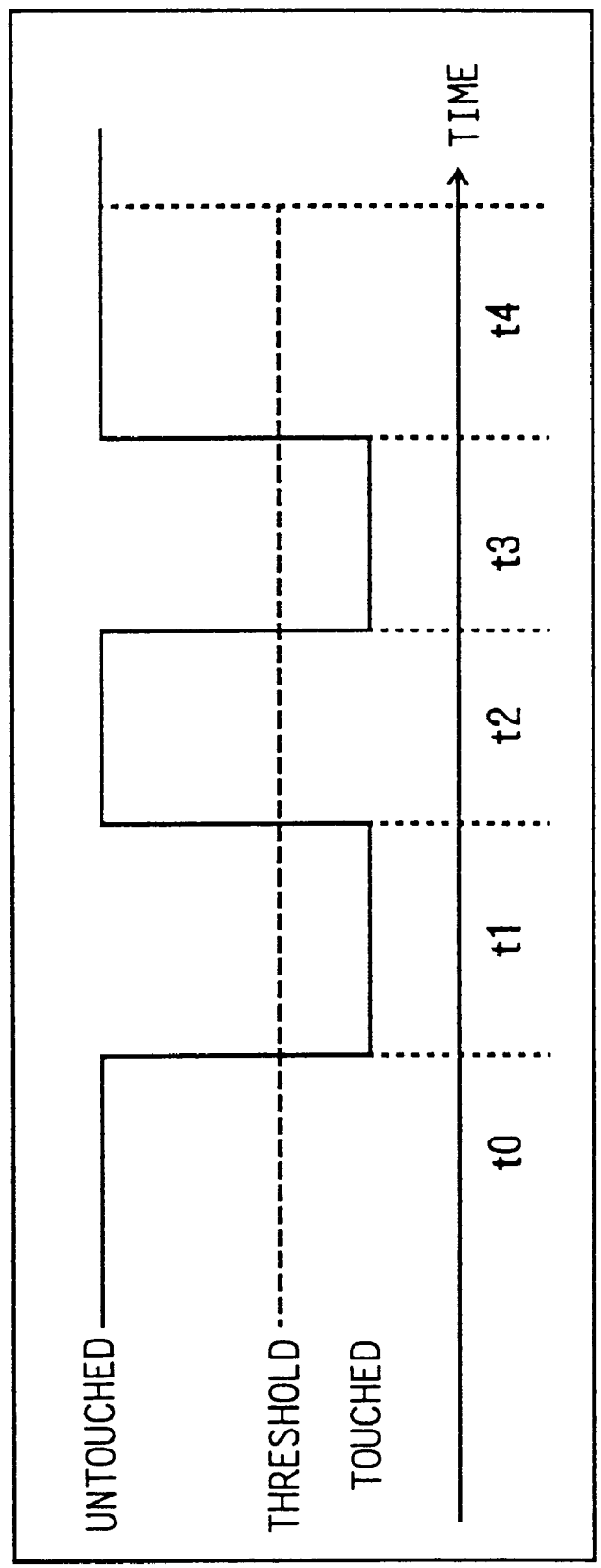
FIG. 4 is a diagram showing another condition for generating switch information.

FIG. 4 shows another condition necessary for the comparator part 34 to determine whether the input generated when the operator touches a point on the coordinate input panel 1 is a switch input. In FIG. 4, symbols t0, t1, t2, t3 and t4 are respectively switch data which are registered beforehand and denote respective continuing times during which the panel is in the touched/untouched state. The voltage value detected when the panel 1 is touched is lower than the threshold voltage, while the voltage value detected when the panel 1 is in the untouched state is higher than the threshold voltage. The condition shown in FIG. 4 is directed to detecting a situation in which the operator successively touches a point twice.

According to the condition shown in FIG. 4, the comparator part 34 recognizes the input from the panel 1 is a switch input and the switch information thereon is expressed as double clicking. More particularly, when the continuing times in the untouched and touched states are equal to or longer than t0 and t1, respectively. Then, the continuing time in the untouched state is equal to or shorter than t2. Then, the continuing time in the touched state is equal to or shorter than t3. Thereafter, the continuing time in the untouched state is equal to or longer than t4.

If it is determined that the condition shown in FIG. 4 is satisfied (YES at step S6), the coordinate detection device executes a process for supplying the external device with switch information that indicates double clicking of the left button of the mouse. If it is determined that the condition shown in FIG. 4 is not satisfied (NO at step S6), the coordinate detection device executes the process for supplying the external device with coordinate data with which the cursor can be moved in the conventional manner (S9). The above description is directed to the case where the left button of the mouse is successively clicked twice. However, the switch information generated in the above-mentioned manner can be used to define various switches other than the double clicking of the left button.

FIG. 5 shows yet another condition necessary for the comparator part 34 to determine whether the input from the panel 1 is a switch input. The condition shown in FIG. 5 detects the following. The operator who operates the external device (information processing device) touches a first point on the coordinate input panel 1, and touches a second point thereon while the operator continues to touch the first point.

Symbols t0, t1, t2, t3 and t4 shown in part (a) of FIG. 5 are switch data which are registered beforehand. The switch data t0 denotes the continuing time of a voltage value obtained when the first point is touched. The switch data t2 denotes the continuing time of a voltage value obtained the second point is touched while the first point is in the touched state. The switch data t4 denotes the continuing time of a voltage value obtained when the second point is in the untouched state while the first point is in the touched state. The switch data t1 denotes the transient time it takes for the voltage to be changed from the voltage obtained when the first point is touched to the voltage obtained when the second point is touched while the first point is in the touched state. The switch data t3 denotes the transient time it takes for the voltage to be changed from the voltage obtained when both the first and second points are touched to the voltage obtained when only the first point is touched. The voltage falls within an accumulated error range for the times t0 and t4. Similarly, the voltage falls within an accumulated error range for the time t2. When the first and points are simultaneously in the touched state, the voltage detected by the voltage detection part 32 at that time is an intermediate voltage value which is located between the voltage value obtained when only the first point is touched and the voltage value obtained when only the second point is touched.

When the condition shown in FIG. 5 is satisfied, the comparator part 34 recognizes the input from the panel 1 as being a switch input. More particularly, the continuing time of the voltage value obtained when the first point is touched is equal to or longer than t0. In this state, it takes the time t1 or shorter to obtain the intermediate voltage after the second point is touched in the state in which the first point is in the touched state. Then, the intermediate voltage continues for the time t2 or longer. Then, only the second point is detached. In this state, it takes the time t3 or shorter for the voltage to reach the voltage obtained when only the first point is touched. Then, the above voltage continues for the time t4 or longer. The switch input thus recognized can be handled as clicking of the right button of the mouse.

If the condition shown in FIG. 5 is satisfied (YES at step S6), the coordinate detection device executes a process for providing the external device with switch information indicating clicking of the right button of the mouse. If the condition is not satisfied (NO at step S6), the coordinate detection device recognizes that there is no switch input and ends the process. The above description is directed to the case where the right button of the mouse is clicked. However, the switch information generated in the above-mentioned manner can be used to define various switches other than the clicking of the right button.

If any of the conditions shown in FIGS. 3, 4 and 5 is satisfied at step S6 executed by the comparator part 34, the control part 31 generates switch information (S7), and the communication part 36 sends the switch information to the external processing device.

Hence, the coordinate detection device can generate two types of switch information. That is, the first type of switch information relates to the case where the operator touches an arbitrary one point on the coordinate input panel 1, and the second type of switch information relates to the case where the operator touches an arbitrary one point (the first point shown in part (b) of FIG. 5) on the coordinate input panel 1 and then touches another arbitrary point (the second point shown therein) thereon while the operator is touching the former point.

Thus, the external device, which is, for example, an information processing device, can be supplied with the coordinate information as if it is supplied from the mouse.

The coordinate detection device of the present embodiment of the invention is not limited to two types of switch information but is capable of generating a plurality of items of switch information.

Figure 6A:
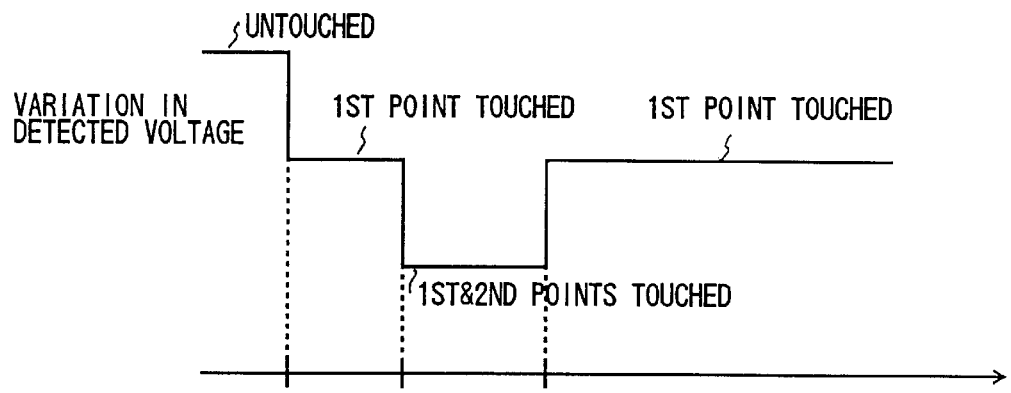
FIGS. 6A, 6B, 6C and 6D show generation of switch information in a case where two points on the panel are touched.
Figure 6B:
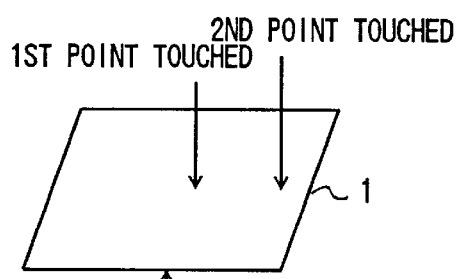

FIGS. 6A and 6B show generation of switch information under the condition shown in FIG. 5 in which the operator touches the second point on the coordinate input panel 1 while touching the first point thereon. The switch information is generated based on the difference between a first voltage obtained when the first point is touched and a second voltage obtained when the second point is touched while the first point is touched. As shown in FIG. 6A, the first voltage is higher than the second voltage.

Figure 6C:
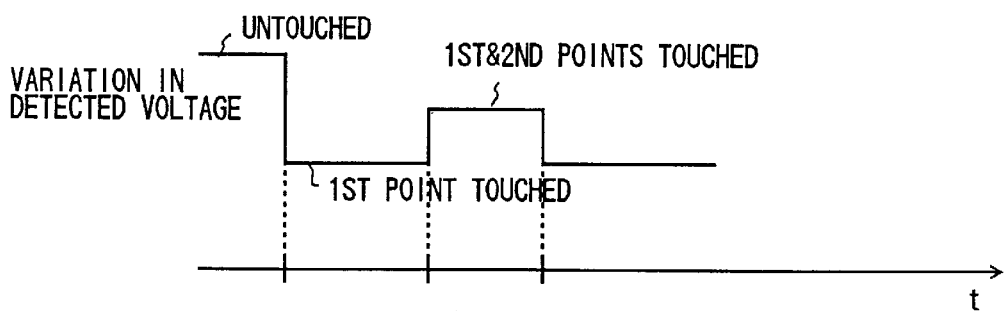
Figure 6D:
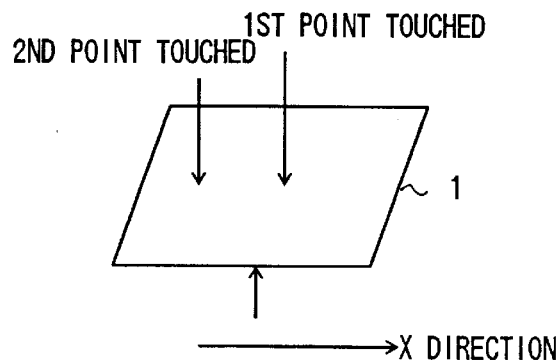

FIGS. 6C and 6D show a variation in generation of switch information under the condition shown in FIGS. 6A and 6B. The switch information is generated based on the difference between the first voltage obtained when the first point is touched and the second voltage obtained when the second point is touched while the first point is touched. As shown in FIG. 6C, the first voltage is lower than the second voltage.

Figure 7:
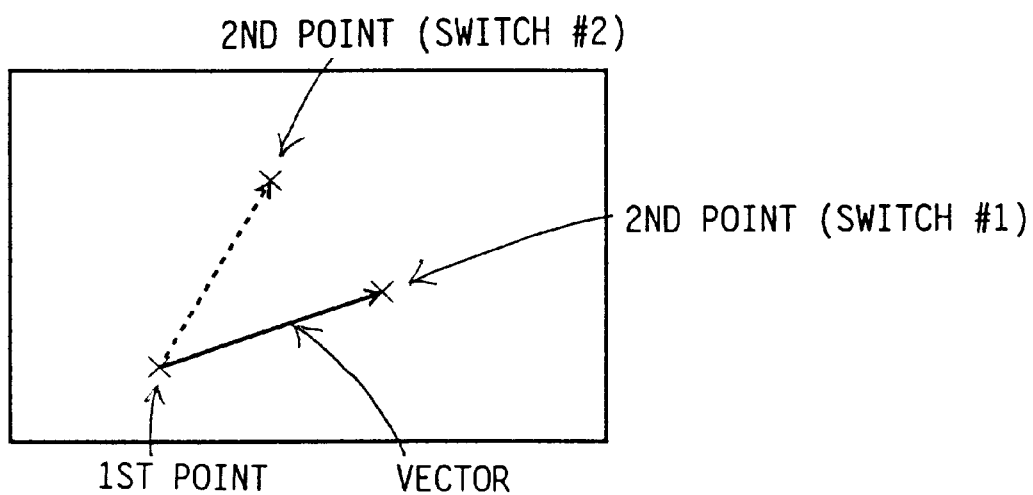
FIG. 7 is a diagram showing a further condition for generating switch information utilizing vectors.

FIG. 7 shows another variation in generation of a plurality of items of switch information. The coordinates of the first point touched by the operator are obtained by referring to the first voltage generated at this time. The coordinates of the second point touched by the operator while the first point is touched are obtained by referring to the second voltage generated at this time. FIG. 7 shows two second points A and B respectively corresponding to switches #1 and #2. A first vector directed to the second point A from the first point is defined, and data on the first vector is stored in the memory part 33. A second vector directed to the second point B from the first point is defined, and data on the second vector is stored in the memory part 33. The comparator part 34 compares the data on the first and second vectors with vector data registered in the memory part beforehand. Hence, a plurality of items of switch information (two items of switch information in the case of FIG. 7) can be generated.

Figure 8:
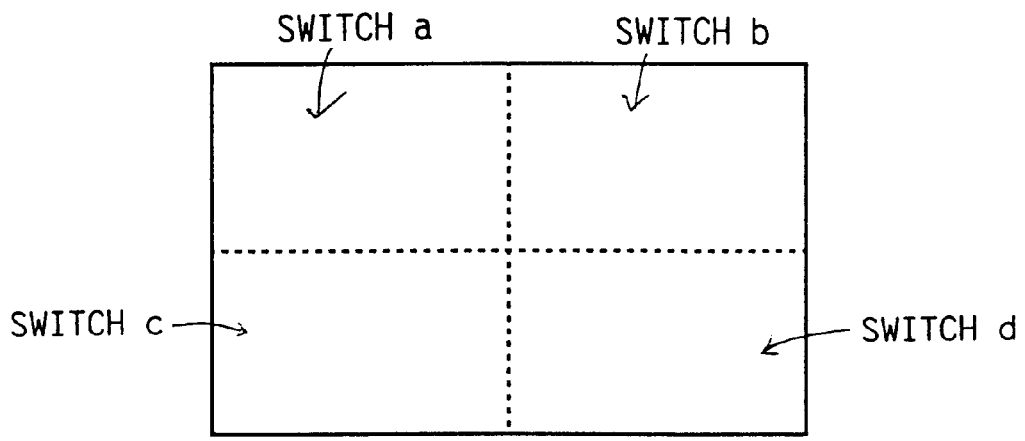
FIG. 8 is a diagram showing another condition for generating switch information in which the panel is segmented into areas.

FIG. 8 shows yet another variation in generation of a plurality of items of switch information. The coordinate input panel 1 is segmented into voltage value detection areas for switches a, b, c and d. Information concerning the relationship between the above segmented areas and the switches is stored in the memory 33.

The coordinate detection device determines whether an input from the coordinate input panel 1 is a switch input by utilizing the switch data or condition shown in FIG. 5 for each of the segmented areas. When the switch condition is satisfied, the corresponding switch information is generated. In each of the segmented areas, two items of switch information can be generated when the conditions shown in FIGS. 3 and 5 are employed. Hence, eight items of switch information can be generated by the coordinate input panel 1 in total. As an increased number of segmented areas is used, an increased number of items of switch information can be generated.

The present invention is not limited to the specifically disclosed embodiments, and variations and modifications may be made without departing from the scope of the present invention.

What is claimed is:

1. A coordinate detection device, comprising:

coordinate input panel which generates coordinate data based on voltages obtained when the coordinate input panel is touched; and a unit generating switch information using the coordinate data when the coordinate input panel is touched at a first point and is then touched at a second point while being touched at the first point, said switch information depending on the coordinates of the second point with respect to those of the first point.

2. A coordinate detection device, comprising:

a coordinate input panel which generates coordinate data based on voltages obtained when the coordinate input panel is touched; and a unit generating switch information using the coordinate data when the coordinate input panel is touched at a first point and is then touched at a second point while being touched at the first point and generating different switch information when the coordinate input panel is touched at a third point different from the second point while being touched at the first point.

3. A coordinate detection device, comprising:

a coordinate input panel which generates coordinate data based on voltages obtained when the coordinate input panel is touched, said coordinate input panel including segmented areas; and a unit generating switch information by using the coordinate data when the coordinate input panel is touched on one of the segmented areas, said switch information having different items depending on the segmented areas.

* * * * *